(12) United States Patent
Janssen

(10) Patent No.: US 11,143,819 B2
(45) Date of Patent: Oct. 12, 2021

(54) OPTICAL FILTER CONTROL

(71) Applicant: Lumentum Technology UK Limited, Towcester (GB)

(72) Inventor: Adrian Perrin Janssen, Devon (GB)

(73) Assignee: Lumentum Technology UK Limited, Northamptonshire (GB)

(*) Notice: Subject to any disclaimer, the term of this patent is extended or adjusted under 35 U.S.C. 154(b) by 0 days.

(21) Appl. No.: 16/652,651

(22) PCT Filed: Jan. 30, 2019

(86) PCT No.: PCT/GB2019/050255
§ 371 (c)(1),
(2) Date: Mar. 31, 2020

(87) PCT Pub. No.: WO2019/186096
PCT Pub. Date: Oct. 3, 2019

(65) Prior Publication Data
US 2021/0011221 A1    Jan. 14, 2021

(30) Foreign Application Priority Data
Mar. 29, 2018  (GB) ........................................ 1805277

(51) Int. Cl.
G02B 6/293    (2006.01)
H04B 10/077   (2013.01)
H04B 10/25    (2013.01)

(52) U.S. Cl.
CPC ....... *G02B 6/29395* (2013.01); *G02B 6/2935* (2013.01); *G02B 6/29349* (2013.01);
(Continued)

(58) Field of Classification Search
CPC .............. G02B 6/29395; G02B 6/2935; G02B 6/29358; G02B 6/29349; H04B 10/25; H04B 10/0775
See application file for complete search history.

(56) References Cited

U.S. PATENT DOCUMENTS 5,825,792 A * 10/1998 Villeneuve ............ H01S 5/0687
372/32
6,046,813 A    4/2000 Naganuma
(Continued)

OTHER PUBLICATIONS

PCT International Search Report and Written Opinion corresponding to PCT/GB2019/050255, dated Apr. 23, 2019, 11 pages.

*Primary Examiner* — Leslie C Pascal
(74) *Attorney, Agent, or Firm* — Harrity & Harrity, LLP

(57) ABSTRACT

An optical filter assembly comprising:
  a tuneable optical filter;
  a beam splitter assembly configured to split an input beam into an output beam,
  a reference beam, and a probe beam, and to direct the output beam and the probe beam through the tuneable optical filter, such that the probe beam is at an angle α to the output beam;
  a first detector configured to measure the intensity S0 of the reference beam;
  a second detector configured to measure the intensity S1 of the probe beam after it has passed through the filter;
  a controller configured to adjust the tuneable optical filter on the basis of the measured intensities of the reference and probe beams.

20 Claims, 4 Drawing Sheets

(52) U.S. Cl.
CPC ..... *G02B 6/29358* (2013.01); *H04B 10/0775* (2013.01); *H04B 10/25* (2013.01)

(56) References Cited

U.S. PATENT DOCUMENTS

| | | | |
|---|---|---|---|
| 6,094,446 A * | 7/2000 | Tei ........................ | H01S 5/0687 372/32 |
| 6,526,079 B1 * | 2/2003 | Watterson ............. | H01S 5/0687 372/20 |
| 2003/0118268 A1 * | 6/2003 | Wimperis ................ | G02B 6/12 385/14 |
| 2004/0120635 A1 * | 6/2004 | Juan ..................... | H04B 10/572 385/15 |
| 2006/0062259 A1 | 3/2006 | Delpiano | |

\* cited by examiner

OPTICAL FILTER CONTROL

CROSS-REFERENCE TO RELATED APPLICATIONS

This application is a 371 national stage of PCT Application No. PCT/GB2019/050255, filed on Jan. 30, 2019 and entitled "OPTICAL FILTER CONTROL," which claims priority to United Kingdom Patent Application No. 1805277.9, filed on Mar. 29, 2018 and entitled "OPTICAL FILTER CONTROL," which are incorporated by reference herein.

FIELD OF THE INVENTION

The present invention relates to a control scheme for a tuneable optical filter, and an optical filter assembly for implementing the control scheme.

BACKGROUND

Fibre optic communications use lasers to generate optical signals within narrow wavelength bands. A single fibre optic cable may carry information in various different bands (and/or different channels within a band). It is therefore important to reduce the noise generated in other bands when transmitting a signal in a target band.

In order to achieve this, the output of a laser/modulator system can be passed through a filter configured to select only the target frequency. One optical component which can act as a filter for this purpose is a Fabry-Perot (FP) etalon (or interferometer). An FP etalon is illustrated in FIG. 1A, and comprises a transparent plate with two reflecting surfaces. As the light bounces between the surfaces, the transmitted rays interfere with each other, producing a characteristic interference pattern, which is dependent upon the frequency and the optical distance between the plates.

The frequency response of a FP etalon has the characteristic curve shown in FIG. 1B. As can be seen, for a high-finesse FP etalon (i.e. one with a sharp peak), the losses for frequencies other than the target frequency are significant, and even slight deviations from the target frequency can be filtered out.

An FP etalon is suitable for use where a component emits light at a constant frequency—but in some applications it is desirable for a component to be "tuneable", i.e. adjustable so as to transmit on different frequencies, e.g. on each channel within a band. The frequency response of the FP etalon depends on the optical distance between the plates, so current tuneable FP etalons take advantage of this by having a material between the plates which expands with temperature, in order to vary the separation of the plates. The optical distance and therefore frequency response of the etalon is therefore adjustable by adjustment of the temperature of the etalon. Other tuneable etalons may use piezoelectric control or other means of varying the optical distance between the plates.

An etalon is s type of infinite impulse response filter. The other suitable type of filter is a finite response filter, such as a Mach-Zehnder or Michelson interferometer. Tuneable versions of any of these filters can be made, and the similar control schemes may be used for each.

Any tuneable filter should be tightly tuneable to ensure that the peak of the transmission function of the filter is closely aligned to the desired frequency. For less demanding applications and certain control schemes, the relationship between the input to the control and the transmission peak of the filter may be such that only a simple calibration is needed, but in many cases a feedback loop will be required in order to ensure that the transmission peak is correctly located.

One simple control scheme is to apply a dither to the transmission peak of the filter (i.e. to the control input of the tuneable filter), and use phase sensitive detection techniques as known in the art to locate the peak. However, close to the transmission peak, the transmission function varies very little with frequency (on the order of a few parts in 1000 for a 10 GHz variation around the peak for a typical filter in the C-band), which means that the signal-to-noise ratio (SNR) of such measurements is very low.

SUMMARY

According to a first aspect of the invention, there is provided an optical filter assembly. The optical filter assembly comprising:
  a tuneable optical filter;
  a beam splitter assembly configured to split an input beam into an output beam,
  a reference beam, and a probe beam, and to direct the output beam and the probe beam through the tuneable optical filter, such that the probe beam is at an angle $\alpha$ to the output beam;
  a first detector configured to measure the intensity S0 of the reference beam;
  a second detector configured to measure the intensity S1 of the probe beam after it has passed through the filter;
  a controller configured to adjust the tuneable optical filter on the basis of the measured intensities of the reference and probe beams.

According to a second aspect of the invention, there is provided a method of controlling an optical filter assembly. The optical filter assembly comprises a tuneable optical filter and a beam splitter assembly, the beam splitter assembly being configured to split an input beam into an output beam, a reference beam, and a probe beam, such that the output beam and probe beam are directed through the tuneable optical filter and the probe beam is at an angle $\alpha$ to the output beam. The method comprises:
  measuring the intensity S0 of the reference beam;
  measuring the intensity S1 of the probe beam after it passes through the tuneable optical filter;
  adjusting the tuneable optical filter on the basis of the measured intensities of the reference and probe beams.

DETAILED DESCRIPTION

Figure 1A:
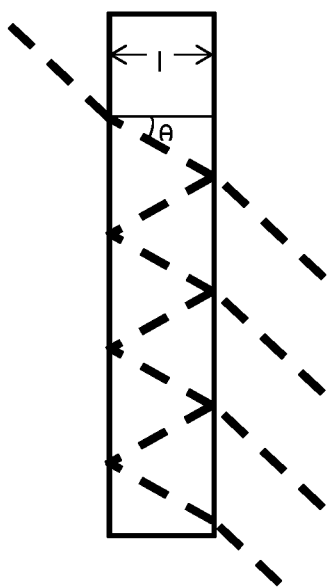
FIG. 1A is a schematic diagram of an etalon.
Figure 1B:
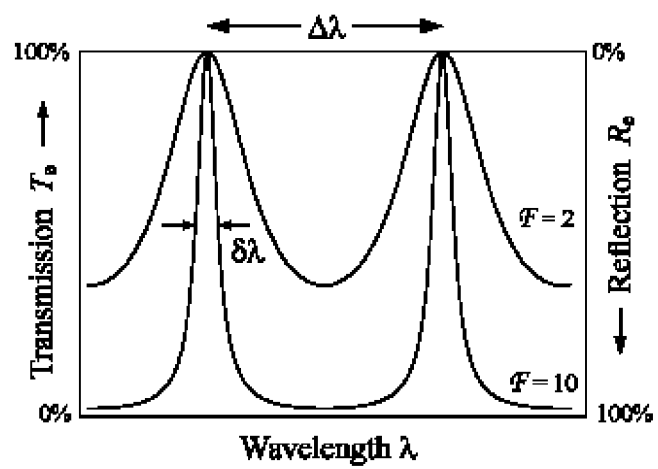
FIG. 1B shows the frequency response curve of an etalon.
Figure 2:
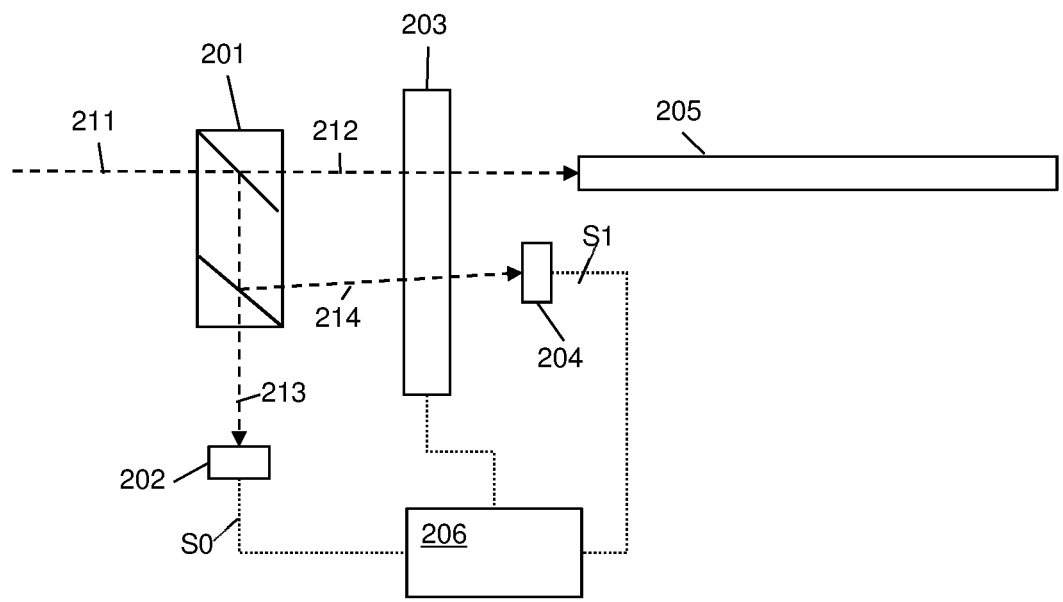
FIG. 2 is a schematic diagram of an exemplary optical filter assembly.

FIG. 2 is a schematic diagram of an optical filter assembly for implementing a filter control scheme which overcomes the above mentioned problems. The assembly 200 is configured to receive an input beam 211, which is split by beam splitter assembly 201 into an output beam 212, a reference beam 213, and a probe beam 214. A first detector 202 is located to measure the intensity S0 of the reference beam 213. The output beam 212 and probe beam 214 are directed through a tuneable filter (e.g. an etalon configured to act as an optical filter) 203, such that the probe beam 214 is at a small angle α to the output beam, and as such passes through a different optical path length within the filter 203. A second detector 204 is located to measure the intensity S1 of the probe beam 214 after it passes through the filter 203. A fibre-optic output or other output 205 to the optical system is located to capture the output beam 212 after it passes through the filter. A controller 206 receives the intensity measurements S0 and S1 from the detectors, and adjusts the filter on the basis of these measurements as described in more detail below.

An exemplary beam splitter assembly 201 comprises two beam splitters, the semi-reflective surfaces of which diverge from parallel by an angle α/2. The output beam passes through the first beam splitter to the filter, the reference beam is reflected from the first beam splitter and passes through the second beam splitter, and the probe beam is reflected by the first and second beam splitters, resulting in the required angle α to the output beam.

Figure 3:
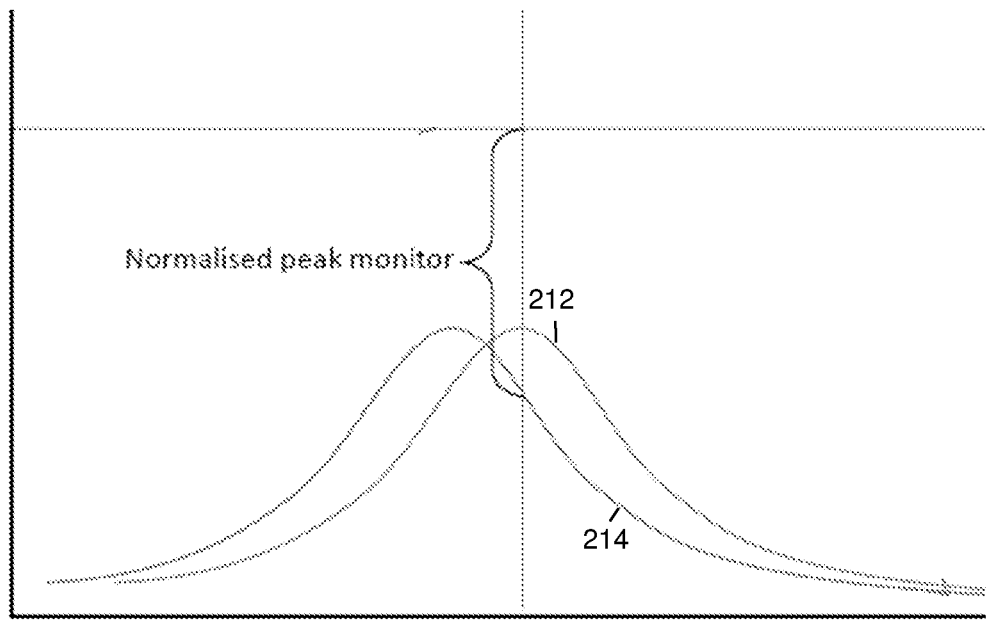
FIG. 3 is a graph showing the transmission function of an exemplary optical filter assembly.

FIG. 3 shows the transmission function of the filter as regards the output beam 212 and the probe beam 214, normalised such that the peaks of each function are at the same value. As can be seen in the figure, the transmission function for the probe beam is offset from that of the output beam. This means that at the frequency corresponding to the peak of the output beam transmission function, the probe beam transmission function has a relatively steep slope. Therefore, measurement of the intensity S1 of the probe beam 212 allows the position on the probe beam transmission function to be determined accurately. This may be measured as the normalised intensity, S1/S0, to avoid noise resulting from intensity variations in the input beam. Since there will be a consistent relationship between the probe beam transmission function and the output beam transmission function, this can be used to find the peak of the output beam transmission function—i.e. for a given target frequency, the control system is configured to tune the filter in order to obtain a particular value of S1/S0, at which the peak of the output beam transmission function corresponds to the target frequency. One advantage of this measurement scheme over the dithering based peak finding schemes is that the direction of the error between the transmission peak and the target frequency can be easily determined from the value of S1/S0. In the example shown in FIG. 3, if S1/S0 is too high then the transmission peak is too high (and the filter should be adjusted to lower the transmission peak), and if S1/S0 is too low, then the transmission peak is too low (and the filter should be adjusted to raise the transmission peak). Depending on the incidence angles of the output and probe beams with the filter, the transmission peaks of the output and probe beams may be offset in either direction.

One advantage of the method described above is that the signal is not dependent on measuring a very small deviation in slope (i.e. at the peak), but instead a large deviation in a region of higher slope. This provides a greater level of signal for control and overcomes the signal to noise problems experienced by control schemes which rely on dithering over the flat part of the top of the filter peak. Furthermore, S1/S0 can be directly measured, and so dithering of the signal is not required.

The calibration of S1/S0 to target frequency may be determined analytically (as the system is relatively simple to characterise, given the known dimensions of the filter and the known angle between the output and probe beams), but some measurement to confirm the calibration may allow more accuracy in the case where the alignment of the filter is not precise (e.g. where the mirrors of an etalon are not precisely parallel). The calibration may be stored on the controller as a look-up table, or as a formula relating the target frequency to the required S1/S0, which the controller can then use to calculate the required S1/S0 for a given target frequency. The controller does not need to be aware of the actual intensity of the output beam, as the ratio S1/S0 is sufficient to determine the location of the transmission peak for the output beam.

Figure 4:
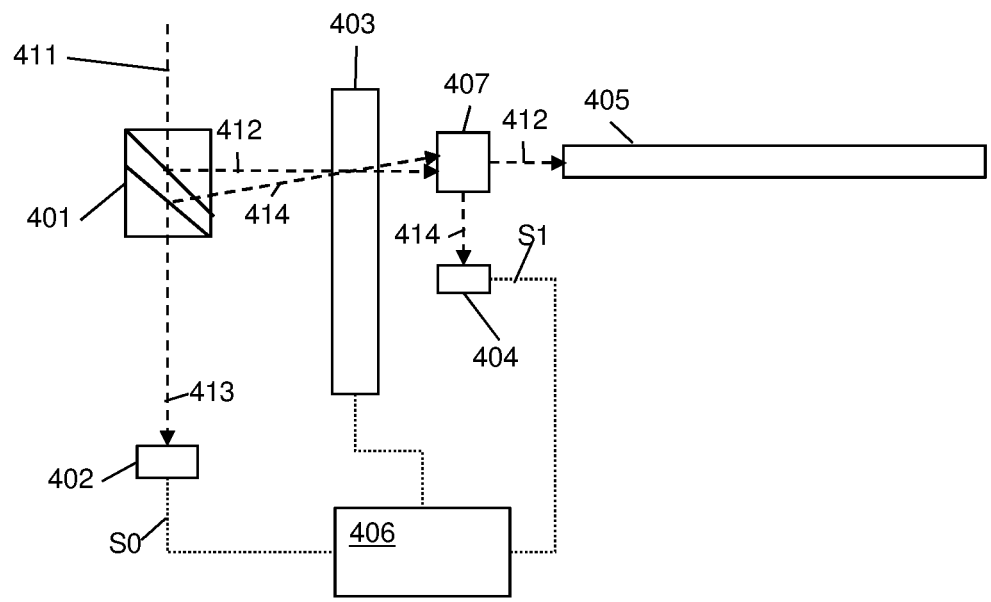
FIG. 4 is a schematic diagram of an alternative exemplary optical filter assembly.

An alternative construction is shown in FIG. 4. This construction comprises a beam splitter assembly 401 which is configured to split an input beam 411 into an output beam 412, a reference beam 413, and a probe beam 414. A first detector 402 is located to measure the intensity S0 of the reference beam 413. The output beam 412 and probe beam 414 are directed through an optical filter 403 such that the probe beam 414 is at a small angle α to the output beam and such that the probe beam 414 and the output beam 412 intersect within the filter. A beam separation assembly 407 is configured to separate the beams once they have passed through the filter. A second detector 404 is located to measure the intensity S1 of the probe beam 414. A fibre-optic output or other output 405 to the optical system is located to capture the output beam 412. A controller 406 receives the intensity measurements S0 and S1 from the detectors, and adjusts the filter on the basis of these measurements as described previously.

The beam separation assembly 407 is present because the width of the output beam 412 and probe beam 414 will cause them to overlap after exiting the filter, resulting in interference if they are not separated before the detector 404 and/or output 405. In the case where the angle α is greater than the divergence angle of the beams, a beam separation assembly 407 can be omitted by providing a sufficiently long optical path between the filter 402 and the detector 404 and output 405 that the beams will be separate by the time they reach the detector 404 and output 405. However, the length of path required would make the filter assembly significantly less compact.

In some optical systems, it may be possible to separate the beams by polarisation filters—however in many optical communication systems, the beams will contain multiplexed signals in orthogonal polarisations, so this would not be possible.

Figure 5:
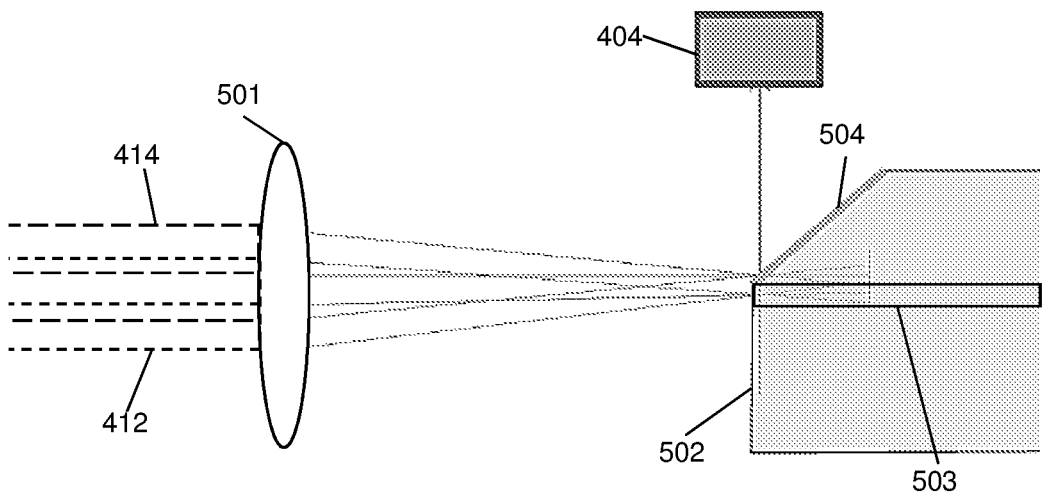
FIG. 5 is a schematic diagram of an exemplary beam separation assembly.

One exemplary beam separation assembly 407 is shown in FIG. 5. This example combines the beam separation assembly 407 with the output 405. The beam separation assembly comprises a lens 501, which focusses the output beam 412 and probe beam 414 to a focal plane 421. As the output beam 412 and probe beam 414 intersect the lens at different angles, they will be focussed to different points on the focal plane 421. An optical fibre 502 is located with a face at the focal plane. The optical fibre 502 has a core 503 and an angled reflective surface 504. The fibre is located such that the core 503 is at the point on the focal plane where the output beam 412 is focussed, and the angled reflective surface 504 is at the point on the focal plane where the probe beam 414 is focussed. With this arrangement, the output beam 412 is captured by the optical fibre 502 (which is then the output to the filter), and the probe beam 414 is reflected away from the optical fibre 502, to the detector 404.

An alternative beam separation assembly may use a lens and a differently angled reflective surface at each of the focal points to reflect the output and probe beams in different directions (i.e. to the output 405 and detector 404 respectively), or any other suitable combination of optical components which allow the beams to be directed apart.

Figure 6A:
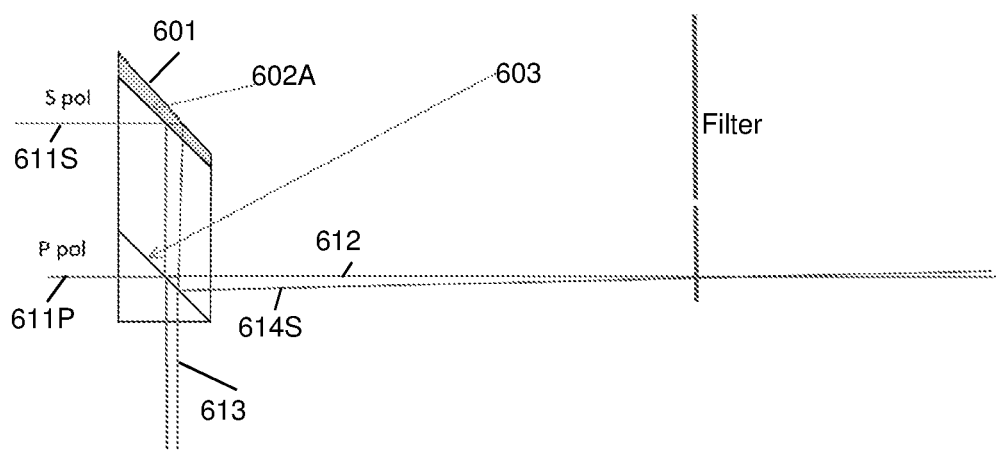
FIGS. 6A and 6B are schematic diagrams of combined beam splitter assemblies and polarisation combiners.
Figure 6B:
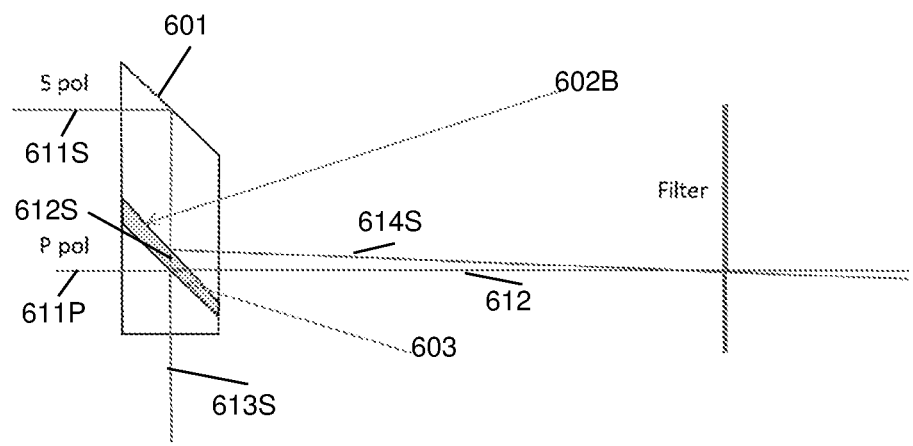

The beam splitter arrangement for the alternative construction may be similar to that described for the construction of FIG. 2 (with the beam splitters located sufficiently close for the intersection of the beams to occur, and angled such that the beams converge).

Where the filter assembly is to be used for an optical system in which two input beams of orthogonal polarisations are combined, the beam splitter assembly 201, 401 may be integrated with the polarisation combiner as shown in FIGS. 6A and 6B. The combined beam splitter assembly and polarisation combiner takes two beams 611S, 611P as inputs (shown as S- and P-polarised, though which beam has which polarisation is arbitrary in practice), and comprises a reflective surface 601, a semi-reflective surface 602A, 602B, and a polarisation combiner 603. The reflective surface 601 and semi-reflective surface 602A, 602B diverge from parallel by an angle $\alpha/2$, and the polarisation combiner 603 is parallel to the reflective surface 601. The polarisation combiner 603 is configured to transmit a small fraction of the s-polarised light, and reflect the rest, and to transmit all p-polarised light (neglecting any losses by absorption). In the case of a construction requiring the beams to intersect within the filter (e.g. FIG. 4), the semi-reflective surface should be angled such that the resulting probe beam converges with the output beam. In a construction where the intersection is not required, the beams may either converge (i.e. to a location outside the filter) or diverge.

In FIG. 6A, the S-polarised input beam first contacts the semi-reflective surface 602A, which splits the beam into an s-polarised output beam (transmitted) and an s-polarised probe beam (reflected). The s-polarised output beam 612S is transmitted through the semi reflective surface 602A, and then reflects off the reflective surface 601 to the polarisation combiner 603, where it is combined with the p-polarised input beam 611P to form the final output beam 612. The s-polarised probe beam 614S is reflected from the semi-reflective surface 602A towards the polarisation combiner 603, from which most of it is reflected towards the filter (the probe beam remains fully s-polarised as there is no equivalent p-polarised beam to combine with). The transmitted fractions of the s-polarised probe beam and the s-polarised output beam together act as the reference beam 613A, and will both be detected by the detector 204.

In FIG. 6B, the s-polarised input beam 611S is reflected by the reflective surface 601 towards the semi-reflective surface 602B, which splits the beam into an s-polarised output beam 612S (transmitted) and an s-polarised probe beam 614S (reflected towards the filter). The s-polarised output beam 612S is then mostly reflected by the polarisation combiner, to form the final output beam 612 with the p-polarised input beam 611P, and a small fraction is transmitted by the polarisation combiner to form the s-polarised reference beam 613S.

The beam combiners in FIGS. 6A and 6B result in an output beam having both s- and p-polarisation, but reference and probe beams having only s-polarisation (or only p-polarisation if the inputs are reversed). However, this is not an issue provided the behaviour of the filter is identical for s- and p-polarisations (which is true for most filters, including etalons, Mach Zender, or Michelson interferometers).

The beam splitter assembly may be arranged such that the output beam has at least 90% of the intensity of the input beam, more preferably at least 95% of the intensity of the input beam. The angle $\alpha$ may be less than or equal to 5 degrees, less than or equal to 2 degrees, or less than or equal to 1 degree, and may be at least 0.1 degrees, or at least 0.5 degrees. The angle $\alpha$ may be chosen such that the offset between the transmission peaks of the output and probe beams is substantially equal to the peak half width or full spectral range of the filter, as this will generally result in the beams being separated such that the transmission peak of the output beam is close to the maximum slope of the probe beam. For example, the angle $\alpha$ may be within 0.1 degrees of this angle for a transmission peak frequency within the operating range of the filter.

While exemplary optical arrangements have been described and shown in the figures, it will be appreciated by the skilled person that other, optically equivalent arrangements may be devised which perform the same function, e.g. by rearrangement of the beam splitters within the beam splitter assemblies 201, 401 in such a way that the required beams are still produced, or by the addition of mirrors or refractive elements to add bends to what are illustrated as straight paths. For example, the beam splitter assembly may include a first beam splitter arranged to split the input beam into any of the output, reference, or probe beams and an intermediate beam, and a second beam splitter arranged to split the intermediate beam into the other two of the output, reference, or probe beams. It will be appreciated that the control scheme described above is independent of the means used to adjust the filter (e.g. thermal control, piezoelectric control, etc.).

The invention claimed is:

1. An optical filter assembly comprising:
a tuneable optical filter;
a beam splitter assembly configured to:
split an input beam into an output beam, a reference beam, and a probe beam,
direct the output beam and the probe beam through the tuneable optical filter such that the probe beam is at an angle relative to the output beam, and
direct the reference beam to a first detector without directing the reference beam through the tuneable optical filter;
the first detector configured to measure an intensity of the reference beam;
a second detector configured to measure an intensity of the probe beam after it has passed through the tuneable optical filter; and
a controller configured to adjust the tuneable optical filter based on the measured intensity of the reference beam and the measured intensity of the probe beam.

2. The optical filter assembly of claim 1, wherein the beam splitter assembly, when directing the output beam and the probe beam, is configured to:
direct the probe beam and the output beam such that the probe beam and the output beam intersect within the tuneable optical filter.

3. The optical filter assembly of claim 2, further comprising:
a beam separation assembly configured to:
separate the output beam and the probe beam after the output beam and the probe beam have passed through the tuneable optical filter, and
direct the probe beam to the second detector.

4. The optical filter assembly of claim 3, wherein the beam separation assembly comprises a lens and an optical fibre having a core and an angled reflective surface at an end of the optical fibre,
   wherein the lens is configured to focus the output beam and the probe beam onto a focal plane,
   wherein the optical fibre is positioned such that the end of the optical fibre is located at the focal plane,
   wherein an end of the core is located at a focal point of the output beam and the angled reflective surface is located at a focal point of the probe beam.

5. The optical filter assembly of claim 4, wherein the probe beam is received at the second detector after the probe beam is reflected from the angled reflective surface.

6. The optical filter assembly of claim 1, wherein the controller, when adjusting the tuneable optical filter based on the measured intensity of the reference beam and the measured intensity of the probe beam, is configured to:
   adjust the tuneable optical filter based on a ratio of the measured intensity of the reference beam and the measured intensity of the probe beam.

7. The optical filter assembly of claim 1, wherein the controller is further configured to:
   determine a target value of a ratio of the measured intensity of the reference beam and the measured intensity of the probe beam; and
   wherein the controller, when adjusting the tuneable optical filter, is configured to:
      adjust the tuneable optical filter based on determining the target value of the ratio.

8. The optical filter assembly of claim 1, wherein the tuneable optical filter is any one of:
   an etalon;
   a Mach-Zehnder interferometer; or
   a Michelson interferometer.

9. The optical filter assembly of claim 1, wherein the beam splitter assembly is further configured to:
   receive the input beam polarised with a first polarisation and a secondary beam polarised with a second, orthogonal polarisation, and
   wherein the beam splitter assembly comprises a polarisation combiner configured to combine the secondary beam with the output beam.

10. A method, comprising:
   splitting, by an optical filter assembly, an input beam into an output beam, a reference beam, and a probe beam;
   directing, by the optical filter assembly, the output beam and the probe beam through a tuneable optical filter of the optical filter assembly,
      wherein the probe beam is directed through the tuneable optical filter at an angle relative to the output beam;
   directing, by the optical filter assembly, the reference beam to a detector without directing the reference beam through the tuneable optical filter;
   measuring, by the optical filter assembly via the detector, an intensity of the reference beam;
   measuring, by the optical filter assembly, an intensity of the probe beam after it passes through the tuneable optical filter; and
   adjusting, by the optical filter assembly, the tuneable optical filter based on the measured intensity of the reference beam and the measured intensity of the probe beam.

11. The method of claim 10, wherein adjusting the tuneable optical filter based on the measured intensity of the reference beam and the measured intensity of the probe beam comprises:
   adjusting the tuneable optical filter based on a ratio of the measured intensity of the reference beam and the measured intensity of the probe beam.

12. The method of claim 11, further comprising:
   determining a target value of a ratio of the measured intensity of the reference beam and the measured intensity of the probe beam; and
   wherein adjusting the tuneable optical filter comprises:
   adjusting the tuneable optical filter based on determining the target value of the ratio.

13. The method of claim 10, wherein directing the output beam and the probe beam comprises:
   directing the probe beam and the output beam such that the probe beam and the output beam intersect within the tuneable optical filter.

14. The method of claim 13, further comprising:
   separating the output beam and the probe beam after the output beam and the probe beam have passed through the tuneable optical filter.

15. The method of claim 14, wherein the detector is a first detector; and
   wherein the probe beam is received at a second detector after the output beam and the probe beam are separated.

16. The method of claim 10, further comprising:
   focusing the output beam and the probe beam onto a focal plane,
      wherein an optical fibre is positioned such that an end of the optical fibre is located at the focal plane,
      wherein an end of a core of the optical fibre is located at a focal point of the output beam, and
      wherein an angled reflective surface of the optical fibre is located at a focal point of the probe beam.

17. The method of claim 16, wherein the detector is a first detector, and
   wherein the probe beam is received at a second detector after the probe beam is reflected from the angled reflective surface.

18. The method of claim 10, wherein the detector is a first detector, and
   wherein the probe beam is received at a second detector after being directed through the tuneable optical filter.

19. The method of claim 10, further comprising:
   receiving the input beam polarised with a first polarisation and a secondary beam polarised with a second, orthogonal polarization; and
   combining the secondary beam with the output beam.

20. The method of claim 10, wherein the tuneable optical filter is any one of:
   an etalon;
   a Mach-Zehnder interferometer; or
   a Michelson interferometer.

* * * * *